(12) United States Patent
Horiuchi et al.

(10) Patent No.: US 6,718,270 B2
(45) Date of Patent: Apr. 6, 2004

(54) VIBRATION TESTING DEVICE AND VIBRATION RESPONSE EVALUATING METHOD

(75) Inventors: Toshihiko Horiuchi, Ushiku (JP); Takao Konno, Minori (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/244,746

(22) Filed: Sep. 17, 2002

(65) Prior Publication Data

US 2003/0055582 A1 Mar. 20, 2003

(51) Int. Cl.[7] .......................... G01F 17/00; G01F 23/00; G01L 7/00; G01N 11/00; G06F 19/00
(52) U.S. Cl. .............................. 702/56; 702/42; 702/33; 702/35; 702/58; 73/11.04; 73/24.01; 73/587; 73/662; 73/663; 700/30; 706/23; 310/90.5; 310/51; 356/72; 324/76.21; 324/76.33
(58) Field of Search .............................. 702/56, 42, 33, 702/35; 73/11.04, 662, 663, 789, 587, 24.01; 700/30; 706/23; 310/90.5, 51; 356/72; 324/76.21, 76.33

(56) References Cited

U.S. PATENT DOCUMENTS

| 5,388,056 | A | | 2/1995 | Horiuchi et al. |
| 5,737,239 | A | | 4/1998 | Horiuchi et al. |
| 5,936,858 | A | * | 8/1999 | Arai .......................... 700/30 |
| 5,942,673 | A | * | 8/1999 | Horiuchi et al. ............ 73/11.04 |
| 6,189,385 | B1 | | 2/2001 | Horiuchi et al. |
| 6,341,258 | B1 | * | 1/2002 | Inoue et al. .................... 702/56 |
| 6,397,153 | B1 | * | 5/2002 | Yamagishi et al. ............. 702/42 |

FOREIGN PATENT DOCUMENTS

| JP | 60-013240 | 1/1985 |
| JP | 09-079939 | 3/1997 |
| JP | 10-206304 | 8/1998 |

\* cited by examiner

Primary Examiner—John Barlow
Assistant Examiner—Aditya Bhat
(74) Attorney, Agent, or Firm—Crowell & Moring LLP

(57) ABSTRACT

A vibration testing device includes a computer system having: a measurement processing block for inputting an output of the monitoring sensor and processing the output; a model substituting block for modeling characteristics of the test piece, calculating a response quantity corresponding to a drive condition of an actuator, and inputting the calculation result to a numerical simulation block and the parameter changing block; the parameter changing block for comparing the calculation result of the model substituting block with the processing result of the measurement processing block, and changing the parameter; the numerical simulation block for calculating a vibration response in accordance with a previously input structure numerical model; and a waveform generating block for calculating a time function of a deformation to be applied to the test piece, and outputting the time block to the actuator controlling device.

7 Claims, 6 Drawing Sheets

IIB-IIB

LOAD-DISPLACEMENT CURVE BASED ON
THE Ramberg-Osgood MODEL

VIBRATION TESTING DEVICE AND VIBRATION RESPONSE EVALUATING METHOD

BACKGROUND OF THE INVENTION

1. Field of the Invention

The present invention relates to an actuator system and a vibration testing method used for evaluating characteristics of a structure which influences an earthquake response or for proving the strength and reliability of the structure by applying a deformation and a load to the structure. More particularly, it relates to a vibration testing device and a method for evaluating a vibration response suitable for a huge structure.

2. Description of the Related Art

A structure is required to be designed so as to have sufficient strength to a load which may be applied to the structure during its use. For example, for building and civil engineering structures, it is important to design them so as to have the sufficient strength to the severest earthquake that may take place during their use. Therefore, a vibration test is carried out to examine a vibration response of the structure itself to the earthquake or to test characteristics of members which influence the earthquake response. For the vibration test, various methods have been proposed. In one method thereof, a deformation or a load which is supposed to be generated at the earthquake is applied to the structure or its members by an actuator to examine a response, a damage state, etc. generated at this time.

In a particular case of the actuator suitable for a large-sized structure, the so-called hybrid experiment techniques have been proposed in which a numerical simulation and a vibration test are combined to reproduce the same vibration state as in the case that a test piece is actually used. One of the above techniques is disclosed in, for example, JP-A-60-13240. Besides, U.S. Pat. No. 5,388,056 discloses an apparatus and a method for carrying out the hybrid experiment technique in real time.

Furthermore, JP-A-9-79939 and JP-A-10-206304 disclose techniques for cooperatively using a plurality of actuators in remote places. These publications disclose constitutions in which a computer as a host sends command signals through a network to drive the actuators at the remote places.

In the case of a huge structure, a part to be subjected as a test piece to the vibration test is also large. Moreover, a plurality of parts of the large structure are often tested. It is difficult from the economical viewpoint that one experimental facility holds an experimental device suitable for the vibration test for such a huge structure. Therefore, it is desirable that one experiment can be performed by cooperatively using the experimental devices in separate experimental facilities that are not always near to one another. Besides, in the case that the numerical simulation is burdened with a heavy load, it is desirable to use a high-performance computer such as a supercomputer. However, such a computer is often put in a different place from the vibration experimental facility. Therefore, even in the case of not using the plurality of actuators, a hybrid experiment using the test device and the computer in remote places is necessary. However, in the technique disclosed in JP-A-60-13240 and U.S. Pat. No. 5,388,056 mentioned above, the computer for performing the numerical simulation is constituted so as to simultaneously control the actuators for the vibration test. This constitution is suitable for performing the test in one experimental facility. Thus, these conventional techniques do not consider the above theme.

Furthermore, the techniques disclosed in JP-A-9-79939 and JP-A-10-206304 mentioned above do not take into consideration a conception of actively varying command signals from the computer in accordance with responses such as the deformation and load of the test piece generated with vibration given by the actuator.

A hybrid experiment technique will be described below, taking as an example an evaluation of an earthquake resistance of a bridge shown in FIG. 2.

A bridge used for a highway or the like is equipped with a plurality of supporting structures each constituting a footing 102 on a ground 101 and a pier 103, and these supporting structures support an upper structure 105 via supporting members 104. A vibration response in the case that the piers are excited horizontally in the IIB—IIB section by earthquake acceleration will be evaluated in a hybrid experiment. Assuming that the whole of the bridges makes the same motion, a partial structure 201 corresponding to one span is drawn and then considered. This drawn structure 201 is divided into a part 202 to be used for numerical modeling and a part 203 to be used as an actual model.

A testing device has a construction as illustrated in FIG. 3. The actual model 203 (hereinafter referred to as a test piece) is fixed onto a base 301. A movable part of an actuator 303 fixed to a reaction wall 302 is connected with the test piece 203. In the connection between the actuator 303 and the test piece 203, a load cell 305 is so disposed that the reaction forces to the deformations applied by the actuator can be measured. The vibration generator 303 is so controlled as to reduce the difference between a feedback signal from a displacement measuring device (not illustrated), which is incorporated in the actuator, and a command value input to an actuator controller 304. A computer 306 has a numerical simulation block 23, a waveform generating block 32, and a measurement processing block 33. The computer 306 generates the input of the actuator controller 304 and outputs it to the actuator controller 304. To calculate this command value, the output of the load cell 305 is used.

The calculation of the command value is carried out by the computer 306, as follows. By the numerical simulation block 23, the computer 306 calculates a vibration response of the part 202 converted to a numerical modeling, using the following equation 1 of motion.

$$[M]\left\{\frac{d^2x}{dt^2}\right\} + [C]\left\{\frac{dx}{dt}\right\} + [K]\{x\} = \{q\} + \{f\} \qquad (1)$$

where $[M]$, $[C]$, and $[K]$ represent the respective matrices of mass, damping, and stiffness, $\{x\}$ does a displacement vector, $\{q\}$ does an external force vector caused by an earthquake, $\{f\}$ does a reaction vector generated at a boundary point between the numerical and actual models.

In the displacement vector, the displacement of the portion corresponding to the boundary point between the numerical and actual models is used as a command value to apply a deformation to the test piece 203. If $\{q\}$ and $\{f\}$, which correspond to external forces, are known, vibration response displacement vector $\{x\}$ can be obtained by numerical integration at intervals of a minute time. For example, according to a centeral difference method, displacement vector $\{x\}_{i+1}$ at time $t_{i+1}$ can be obtained by the following equation 2, where suffix i indicates that the value is at time $t_i$.

$$\{x\}_{i+1} = \left\{[M] + \frac{\Delta t}{2}[C]\right\}^{-1} \quad (2)$$

$$\left([M](2\{x\}_i - \{x\}_{i-1}) + \frac{\Delta t}{2}[C]\{x\}_{i-1} + \Delta t^2(\{q\}_i + \{f\}_i - [K]\{x\}_i)\right)$$

$\{q\}_i$ necessary for this calculation is a test condition, so it has been stored in the computer or it is externally given in accordance with the progress of the test. For reaction force $\{f\}_i$, the reaction force of the test piece 203 actually generated in the test is measured with the load cell 305. The output of the load cell 305 is properly processed by the measurement processing block 33 to be used as the reaction force $\{f\}_i$. Besides, based on the processing result by the numerical simulation block 23, a time function of displacement to be applied to the test piece is calculated by the waveform generating block 32. The obtained function is output as command values.

That is, a vibration test process and a vibration response calculating process are simultaneously progressed in the following procedure: (1) reactive force $\{f\}_i$ is measured; (2) $\{x\}_{i+1}$ is calculated by the equation 2 using external force $\{q\}_i$ and reaction force $\{f\}_i$ as external forces; (3) the obtained displacement at the boundary point between the numerical and actual models is applied to the test piece 203 with the actuator 305; and (4) the procedure is returned to step (1). By repeating the above steps, the vibration response of the whole structure can be evaluated by the vibration test with only one part.

In this technique, the computer 306 outputs control signals directly to the actuator controller 304. Therefore, the computer 306 must be disposed near the actuator 303 and the actuator controller 304. Besides, it is a necessary condition that the test piece reaction can accurately be measured. In the case of a vibration test using plural actuators, however, if some trouble has occurred in one actuator and as a result, the reaction of the corresponding test piece cannot be obtained, the test will end in failure though the other actuators are out of any trouble. In such a case, the whole expense of the test can be wasteful.

SUMMARY OF THE INVENTION

The present invention has been developed to solve the above-mentioned problems of the conventional techniques in a vibration testing device and a testing method for evaluating strength and reliability of a huge structure to, for example, an earthquake, and an object of the present invention is to provide a highly reliable vibration testing device in which one or more actuators are connected with a computer disposed in a remote place, and a method for evaluating a vibration response.

In order to achieve the above object, a first aspect of the present invention is directed to a vibration testing device constituting one or more actuator systems each including an actuator having a movable part for applying a deformation to a test piece, a control sensor for measuring a drive condition of the actuator, an actuator controlling device for controlling the drive condition of the actuator by the use of an input command signal and an output of the control sensor, and a monitoring sensor for measuring the response condition of the test piece and the drive condition of the actuator; and a computer system for outputting an command signal to each actuator system, wherein the computer system has a measurement processing block for inputting an output of the monitoring sensor and processing it so as to be able to be used in a parameter changing block; a model substituting block for modeling characteristics of the test piece vibrated in the actuator system by the use of a finite number of parameters, calculating a response quantity corresponding to the drive condition of the actuator, and then inputting the calculation result to a numerical simulation block and the parameter changing block; the parameter changing block for comparing the calculation result of the model substituting block with the processing result of the measurement processing block, and changing the parameter so that the actual characteristics of the test piece may substantially coincide with the characteristics of the test piece in the model substituting block; the numerical simulation block for calculating a vibration response at each interval of a preset time on the basis of a previously input structure numerical model, the processing result of the model substituting block, and a time function given as an external force applied to the structure; and a waveform generating block for calculating a time function of a deformation to be applied to the test piece on the basis of the result of the numerical simulation block, and outputting it as an instruction value to the actuator controlling device, whereby a series of processes of the model substitution, the numerical simulation and the waveform generation, and a series of processes of the measurement processing and the parameter change are repeatedly performed in parallel.

A second aspect of the present invention is directed to a method for evaluating a vibration response of a structure containing a main structure and one or more secondary structures connected thereto, constituting a numerical simulation processing step of calculating the vibration response at each interval of a preset time on the basis of a numerical model of the main structure, results of secondary structure model processing subsequently calculated, and a time function given as an external force applied to the structure; a secondary structure model processing step of modeling characteristics of the secondary structure by the use of a finite number of parameters and calculating a response quantity corresponding to a response of a portion interconnecting to the main structure; a test piece vibration processing step of vibrating a test piece for evaluating the characteristics of the secondary structure on the basis of the results of the numerical simulation processing to measure its response quantity; and a parameter change processing step of comparing the calculation results of the secondary structure model processing with the results of the test piece vibration processing, and successively changing a parameter so that the actual response of the test piece may substantially coincide with the response of the secondary structure in the secondary structure model processing, whereby the secondary structure model processing and the numerical simulation processing are repeatedly performed, and in parallel with this processing, the test piece vibration processing and the parameter change processing are repeatedly performed.

Other objects, features and advantages of the invention will become apparent from the following description of the embodiments of the invention taken in conjunction with the accompanying drawings.

DETAILED DESCRIPTION OF THE EMBODIMENTS

Figure 2A:
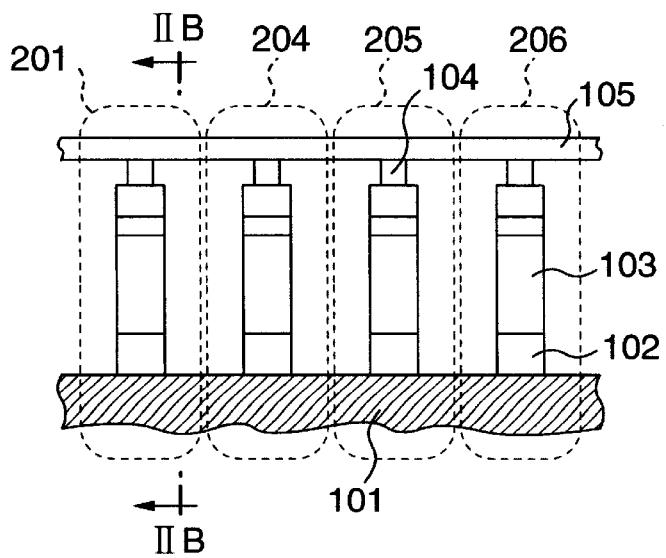
FIG. 2A is a schematic diagram of a bridge beam as a structure to be evaluated, which is used in the vibration testing device shown in FIG. 1.
Figure 2B:
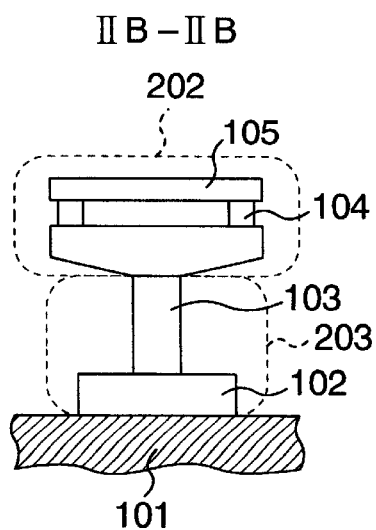
FIG. 2B is a cross-sectional diagram indicated by the arrows IIB—IIB on FIG. 2A.
Figure 3:
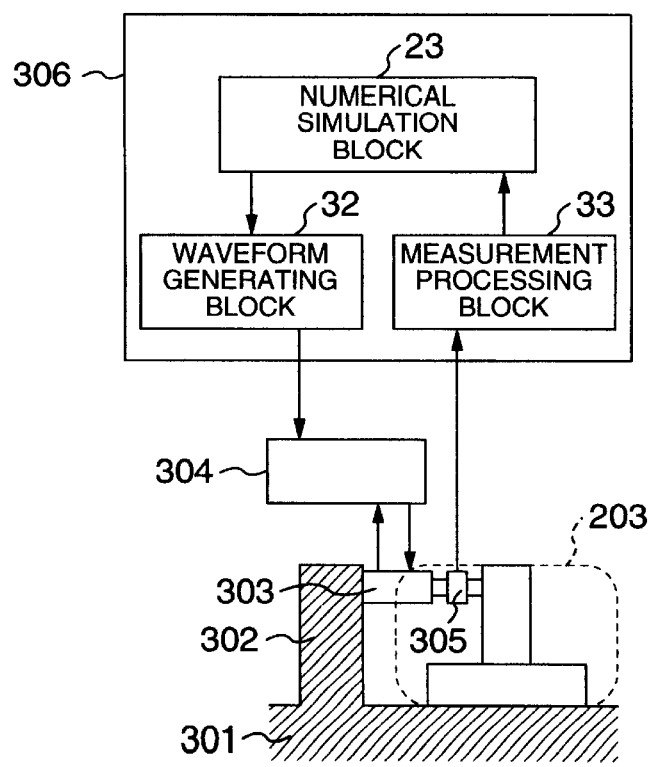
FIG. 3 is a schematic diagram showing a hybrid experimental apparatus according to the conventional structure.

In the following, an embodiment of the present invention will be described with reference to the drawings. Here, an embodiment of the present invention will be described with using the vibration test for a bridge beam shown in FIG. 2 as an example. First, considerations will be given to a vibration testing device shown in FIG. 3. In the vibration test for the bridge beam as shown in FIG. 2, the same number of actuators as that of the concerned support structures may be connected to a computer 306. However, the configuration of the actuator and the dynamic characteristics thereof and the characteristics of a sensor and the installation condition thereof are different depending on the respective facility for the actuator and the test piece. Therefore, if all of the waveform generating blocks 32 and measurement processing blocks 33 for the actuator are mounted to the computer 306, processes such as data inputting become complicated. As a result, the versatility as an experimental apparatus is also deteriorated. In addition, since a great number of large actuators capable of exciting a large-scale structure are rarely provided in an experimental site, it is difficult to directly connect these large actuators. Further, in a case where it is needed to perform the complicated numerical simulation in the computer 306, the high-speed computer is required. However, such a computer is utilized as a public facility, and is installed in a place apart from the experimental site in many cases. A sub-computer 3 is desirably installed close to an actuator controlling device 304 so as to reduce the noise to the command signal.

In such a structure, in this embodiment, the computer 306 for outputting the waveform is divided into a main computer 2 and sub-computers 3 provided in each actuator. Then, a numerical simulation block 23 is incorporated in the former, and the waveform generating block 32 and the measurement processing block 33 are incorporated in the latter. Also, a network serving as a communication means is used to connect the actuator and the computer.

If the achievement of the accurate measurement of the reaction force from the test piece is set as essential requirements like in the hybrid experiment, in such a case where a plurality of actuators are used in the vibration test and some troubles occur in one of the actuators and the reaction force from the test piece cannot be obtained, the entire test ends up in failure in spite of no problems in other actuator systems. As a result, all of the cost used in the experiment is disadvantageously lost in some cases. For its prevention, the test according to this embodiment is designed so as not to be directly influenced by the partial measurement failure of the reaction force.

Figure 1:
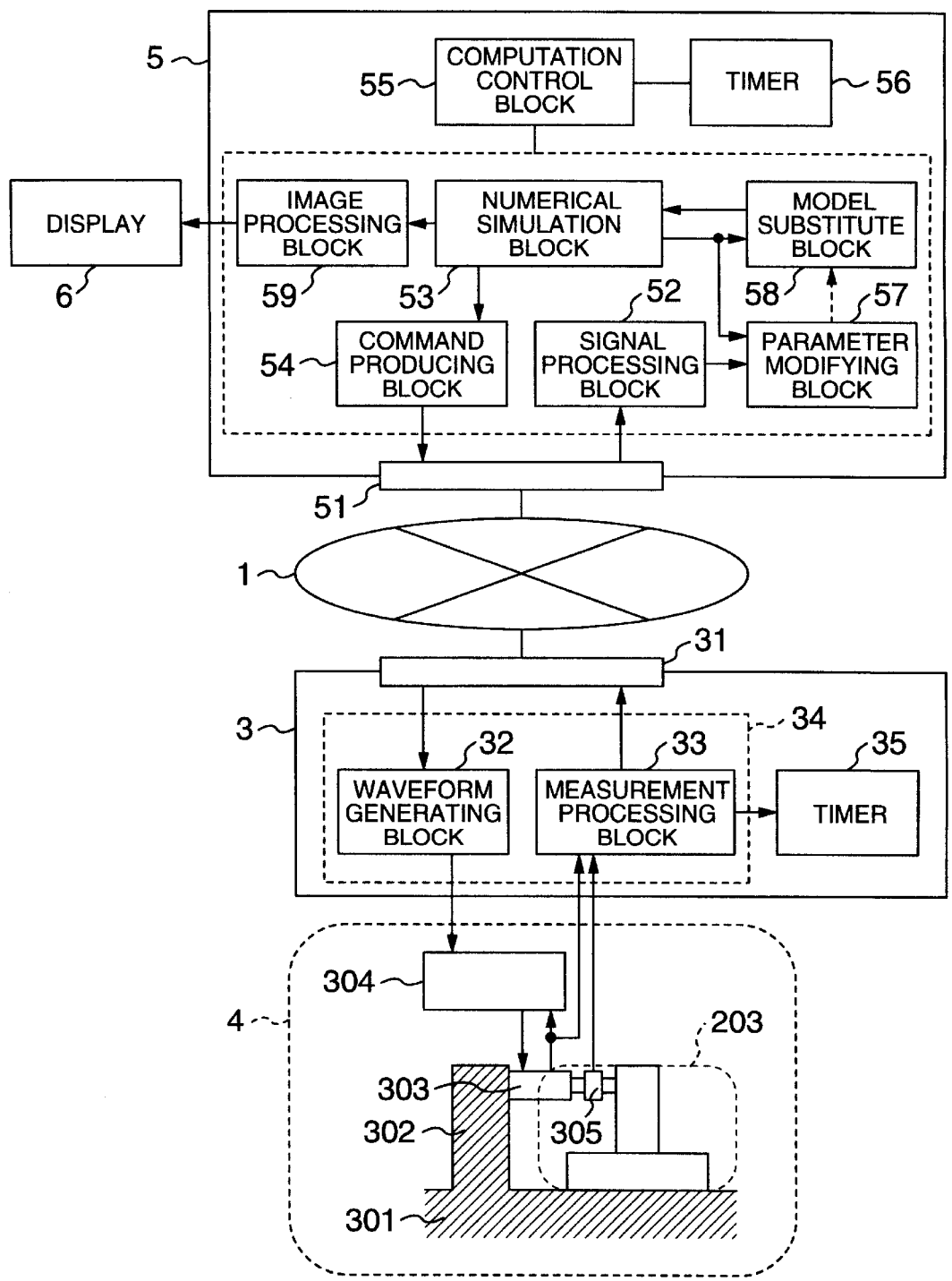
FIG. 1 is a block diagram showing an embodiment of a vibration testing device according to the present invention.

In the following, the embodiment will be described in more detail with using FIG. 1. In FIG. 1, illustrations for describing other embodiments are included, and components not described below are not directly related to this embodiment. The vibration testing device is constituted of a network 1 serving as a medium for transmitting/receiving data among the devices connected thereto, a main computer 5 having a network connection block 51 and connected to the network, and a pair of or several pairs of sub-computer 3 having a network connection block 31 and a vibration generating system. FIG. 1 illustrates a case where a pair of the sub-computer 3 and the vibration generating system 4 is provided. In this case, the vibration generating system 4 is constituted of the components as follows. That is, (a) an actuator 303 having a moving part for causing a deformation in the test piece 203, (b) a control sensor (a displacement sensor in this case, not shown) for measuring the driving state of the actuator 303, (c) the actuator control device 304 for controlling the driving state of the actuator by the use of a command signal to be inputted and the input from the control sensor, and (d) a monitor sensor (a load cell 305 in this case) for measuring a response state of the test piece 203. In addition, the sub-computer 3 is provided with a network connection function 31 and is connected to the network 1. The sub-computer 3 outputs the command signal to the actuator control device 304, and the output from the monitor sensor 305 is inputted to the sub-computer.

Also, the configuration of the main computer 5 has the following components, that is, a model substitute block 58 in which the characteristics of the test piece excited by the actuator system is modeled by using a finite number of parameters and the response amount in response to the driving state of the actuator is computed; a signal processing block 52 for processing the measurement information transmitted via the network 1 from the sub-computer 3 so as to be used in the parameter modifying block; the parameter modifying block 57 for comparing the computation result in the model substitute block 58 and the processing result in the signal processing block 52 and then modifying the parameters so that the characteristics of the actual test piece and that of the test piece in the model substitute block 58 become almost identical to each other; a numerical simulation block 53 for computing the vibration reaction at every predetermined interval based on the previously inputted structure numerical model, the processing result in the model substitute block, and the time function given as an external force applied to the structure; a command producing block 54 for producing the command information relative to the driving of the actuator system based on the computation result of the numerical simulation block and then transmitting the command information to the sub-computer via the network; and a computation control block 55 for controlling the repetition of the model substitute process, the numerical simulation, the command signal production, and the command information transmission, and simultaneously, the repetition of the process for obtaining the measurement information, signal processing, and the parameter modifying process, namely, the computation control block 55 controls two computation processes.

Furthermore, the sub-computer 3 is provided with: the waveform generating block 32 for generating the time function used to control the vibration generator 303 based on the command information transmitted from the main computer 5 via the network 1 and then outputting the time function as the command signal to the vibration generator controlling device 304; and the measurement processing block 33 for obtaining the output value of the monitor sensor after determining the timing to obtain the measurement value, and producing the measurement information to be transmitted to the computer 5 based on the output value, and then, transmitting the produced information to the main computer 5 via the network 1.

In order to determine the timing to obtain the measurement value, the output of the control sensor is inputted to the measurement processing block 33. The output of the monitor sensor received in the measurement processing block 33 contains the necessary data by the parameter modifying block 57, and the control sensor functioning also as the monitor sensor may be used.

In the following, the model substitute block 58 and the parameter modifying block 57 will be described. For an example, as a model of the characteristics of the test piece used as the model substitute block 58, the elastic-plastic element described by the Masing's law shown below is considered. It is assumed that the skeleton curve is defined with the following equation 3, based on the generalized force P (e.g., sharing force) and the generalized displacement δ.

$$P = f(\delta) \qquad (3)$$

By using this function, the relationship between the generalized force P and the generalized displacement δ in the case where the force and displacement are started from Pr and δr is defined as the following equation 4.

$$\frac{P - Pr}{m} = f\left(\frac{\delta - \delta r}{m}\right) \qquad (4)$$

In this case, m represents the magnification to expand the skeleton curve. In an ordinary case, m=2 is selected so as to achieve the force-displacement relation in a stable state in which δ=−δ0 to δ0 is reciprocated. Furthermore, when reloaded, it is assumed that at a position crossing a slant curve, movement is given on the curve. In addition, the Ramberg-Osgood model is frequently used as the elastic-plastic element, and is expressed by the following equation 5.

$$\delta = \frac{P}{Ko}\left\{1 + \alpha\left(\frac{P}{Py}\right)^{\beta}\right\} \qquad (5)$$

Figure 5:
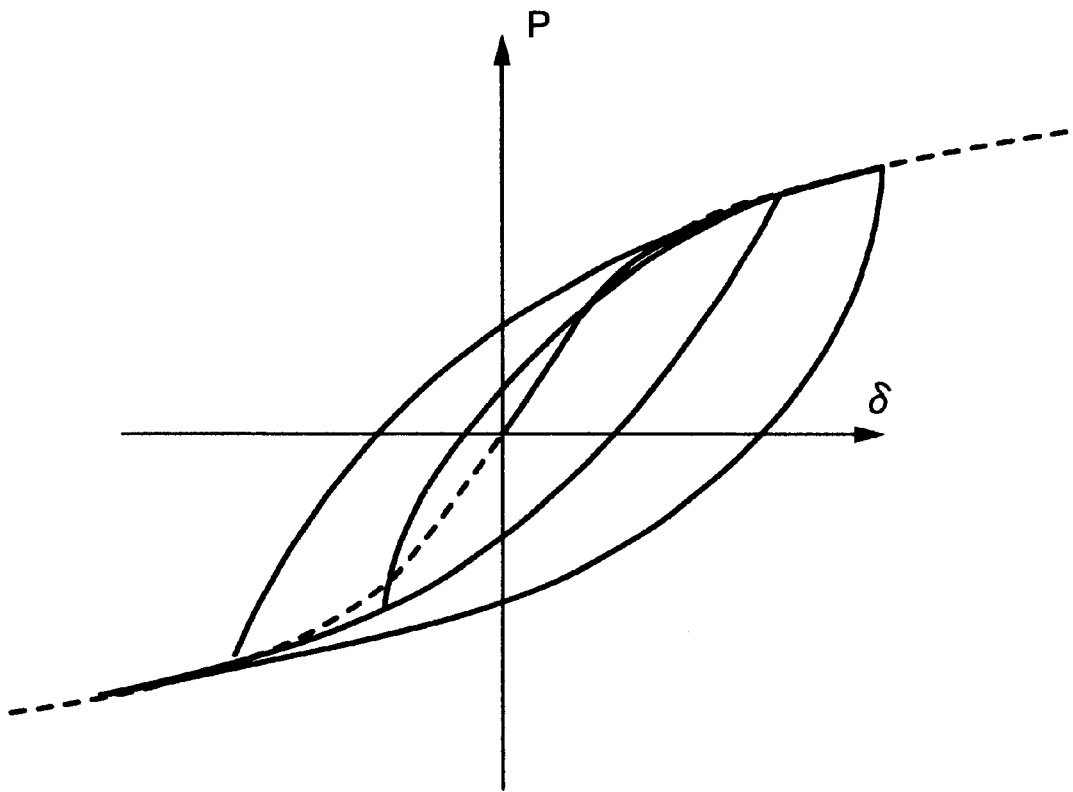
FIG. 5 is a graph used to explain the relationship between load and displacement.

In this case, α, β, and Py are parameters to determine the skeleton curve, and Ko is the initial stiffness. An example of the displacement-load relationship in this model is shown in FIG. 5. More specifically, if four parameters can be obtained, the characteristics of the test piece can be roughly described. By comparing the output of the model substitute block 58 and the processing result of the measured signal in the signal processing block 52 as these parameters in the parameter modifying block 57, the optimum value properly representing the characteristics of the actual test piece is obtained one after another, whereby it is possible to make the model substitute block 58 more accurate.

Figure 6:
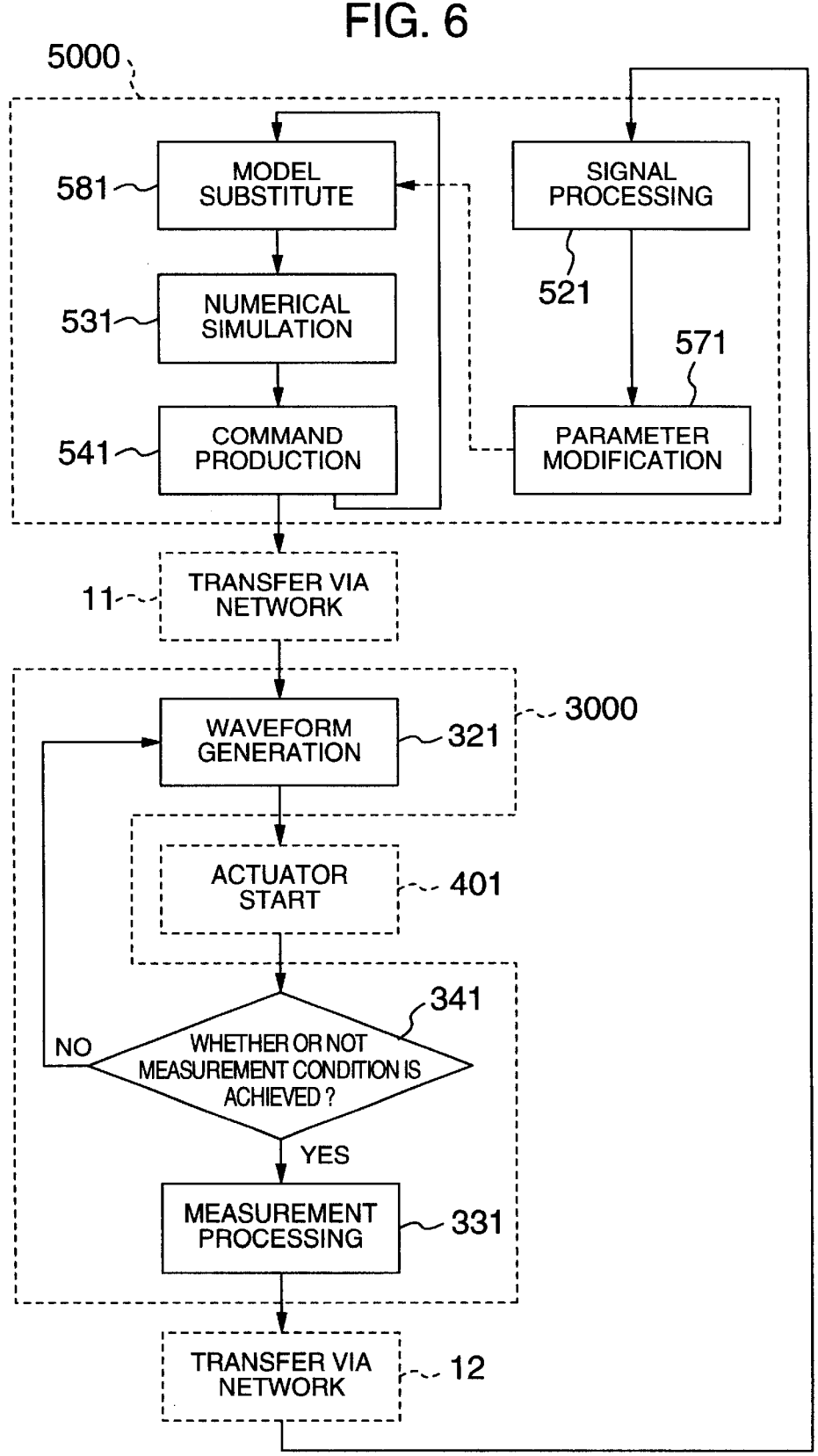
FIG. 6 is a flow chart showing an example of process flow of the method of the vibration test using the vibration testing device shown in FIG. 1.

The process flow of the vibration test using the vibration testing device according to this embodiment will be described with reference to FIG. 6.

First, the process 5000 performed in the main computer 5 will be described. The process is divided into two flows. In the first flow, the model substitute process (block 581) by the model substitute block 58, the numerical simulation process (block 531) by the numerical simulation block 53, and the command producing process (block 541) by the command producing block 54 are repeated. The characteristics of the test piece are initially simulated based on the output of the model substitute block in this embodiment. Therefore, this embodiment is characterized in that the numerical simulation process (block 531) can be performed independently of the vibration test of the test piece using the actuator system 4. In the second flow, the signal processing (block 521) by the signal processing block 52 for processing the measurement result of the vibration test of the test piece obtained as a result of the process in the actuator system 4 shown below and the parameter modifying process (block 571) by the parameter modifying block 57 are performed.

The process flow in the actuator system 4, mainly in the process 3000 performed in the sub-computer 3, is as follows. The sub-computer 3, receives the process result from the main computer 5, which is transferred via the network 1 (block 11). The waveform generating block 32 performs the waveform generation process (block 321) to drive the actuator based on the process result. More specifically, the information transferred via the network is converted into a form usable for the waveform generation, and the time function of the command signal for changing the driving state of the actuator from the current driving state to the directed driving state is produced in a form suitable for the characteristics of the actuator to be controlled, then outputting to the actuator controlling device 304 as the command signal. The actuator is driven according to the command signal (block 401). The determination whether or not the measuring condition is achieved is made by the measurement processing block 33 one after another (block 341). When it is determined that the condition is satisfied, the measurement process 331 is performed by the measurement processing block 33. More specifically, the measured load is converted into a transferable form through the network, and then transferred to the designated direction on the network. The data concerned is transferred to the main computer 5 via the network 1 (block 12), and is used in the process 5000 performed in the main computer 5 in the next step.

Note that no descriptions have been made about the start and finish of the loop. However, it goes without saying that similar to the repetition of the normal process, the process is started and finished in an appropriate manner for the respective apparatus configuration. Also, in addition to the general processing, the vibration testing device according to the present invention is identical to the standard vibration testing device in that the emergency shutdown block is provided as the measures for safety.

In this embodiment, since the numerical simulation and the vibration of the test piece can be independently performed, the vibration test in which the main computer 5 and the vibration generating system 4 located apart from each other are combined can be implemented even under the condition that the information transfer via the network is unstable. The reason thereof is that, since the measurement value of the vibration test is not essential, it is possible to perform the test while appropriately complementing the information.

Figure 4:
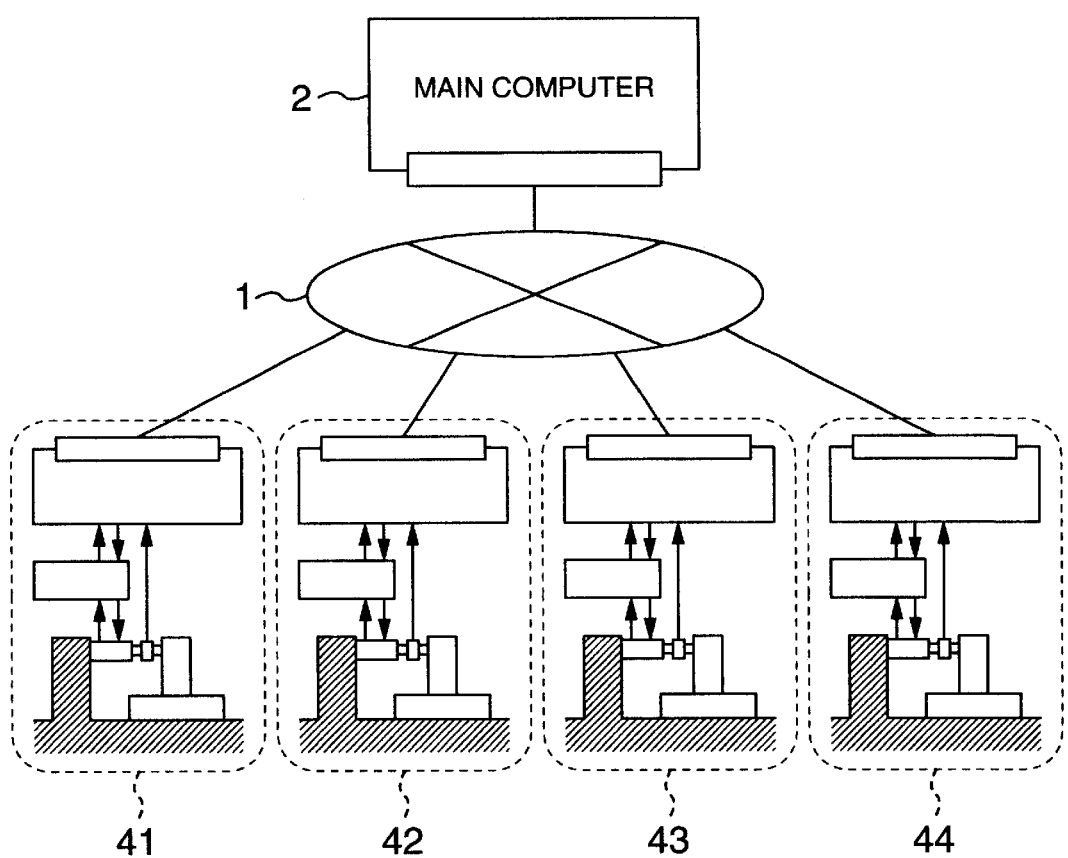
FIG. 4 is a block diagram showing another embodiment of a vibration testing device according to the present invention.

Note that the case where one vibration generating system 4 is provided is described in this embodiment for the simplification of the description. However, the test using a plurality of actuator systems combined to each other is also possible in the present invention. The embodiment in such a case will be described with using a seismic test of the bridge beam shown in FIG. 2 as an example. The bridge beam is supported by a plurality of bridge piers, and the characteristics and the support conditions of the bridge piers may be different from each other. In this case, the above-mentioned assumption that the entire bridge beam reacts in the same manner is not acceptable. Therefore, different from the embodiment shown in FIG. 1 in which the part 201 is only the object to be excited, the parts 204 to 206 also serve as the objects to be excited in this embodiment. The configuration in this case is shown in FIG. 4. By using this configuration, the vibration test closer to the real case can be performed. In addition, since a number of actuators provided in remote sites are combined in the vibration test, the use of the network can obtain many advantages. In order to perform the test in this configuration, it is required that the contents of the signal processing block 52 and the command producing block 54 in the main computer 5 are adjusted so as to match the use of the plurality of the sets of the vibration generating systems and the sub-computers 41 to 44. In addition, the numerical model used in the numerical simulation block 53 must be changed so as to match the use of the plurality of test pieces.

In the foregoing descriptions, the types of the network are not particularly mentioned. However, the LAN exclusive for the test apparatus can be established, alternatively, the so-called Internet can be used in the configuration of the test apparatus. The case using the Internet does not require so much cost for establishing the network, and such a configuration of the vibration testing device that a computer in Japan and a vibration generating system in the U.S are combined can be achieved.

In addition, other communication means such as satellite communication is also available, and the communication means in the present invention is not particularly limited. Also, the case where the network is used as the communication means has been exemplified in the above-described embodiments. However, the communication means is not limited to this. The present invention can be configured by changing the configuration for data transmitting/receiving depending on the communication means to be used. Furthermore, the advantages of this patent can be obtained if not dividing into the main computer and the sub-computer. This condition is also applicable to the following embodiments.

Figure 7:
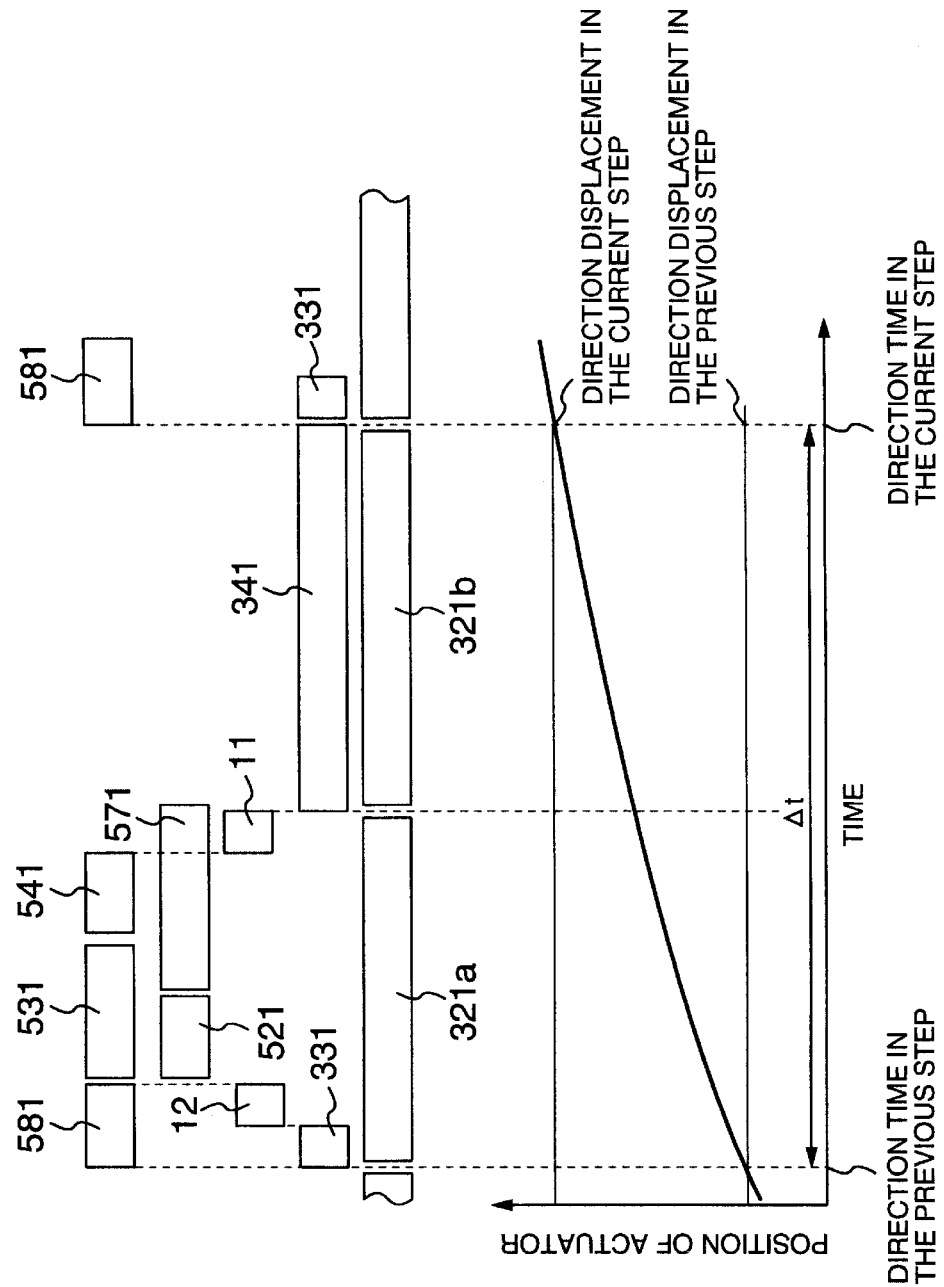
FIG. 7 is a timetable showing the process in the method of the vibration test shown in FIG. 6.

Another embodiment of the present invention will be described with reference to FIGS. 1 and 7. In this embodiment, both the main computer 5 and the sub-computer 3 are provided with timers set to the same time as shown in FIG. 1, 56 and 35, respectively. In the main computer 5, the command producing block 54 designates the time when the numerical simulation block 53 starts to operate as a designated time at which the first target value of the driving state of the actuator 303 is to be achieved. Also, in the following steps, the command producing block 54 designates the time obtained by adding a predetermined time period Δt to the time designated in the previous step as the designated time, and then, produces the information containing the set of the target value of the driving state of the actuator 303 and the designated time as the command information to be transmitted to the sub-computer 3. In the sub-computer 3, the waveform generating block 32 generates a waveform so as to achieve the target value of the driving state at the designated time, and the measurement processing block 33 designates the designated time as a timing to obtain the measurement value. Also, it is set that the entire sequence of processes is performed at every predetermined interval of time. More specifically, FIG. 7 shows an example of the timetable for the process to perform the vibration test with using the experimental apparatus according to this embodiment. FIG. 7 shows the case where the state of the actuator to be controlled is the position of the actuator. The lower graph of FIG. 7 shows the position of the actuator in terms of the time function, and the upper bars of FIG. 7 is the timetable showing the process contents so as to correspond to the horizontal axis (time) of the lower graph.

In the main computer 5, the model substitute process (block 581), the numerical simulation process (block 531), and the command producing process (block 541) are performed one after another. The command information is transferred to the sub-computer 3 via the network (block 11).

Until the time when the vibration generator controller 3 receives the information, the way to drive the actuator from the target displacement at the designated time set at the previous step to the next target time is not determined. Therefore, the waveform generation is continued by means of extrapolation by using the past target values (block 321a), thereby continuing to drive the actuator. At the stage where the information containing the next target displacement can be obtained, the path of the command signal is corrected so as to achieve the target displacement at the designated time, and then, performing the waveform generation (block 321b). On a parallel with the block 321b, the measurement control block 34 monitors the timer 35 (block 341) and provides the command to the measurement processing block 33 at the time of the designated time, and then, the measurement processing block 33 performs the measurement process (block 331).

As a result of the measurement process (block 331) of the sub-computer 3, the main computer 5 receives the measurement result through the transmission (block 12) via the network. Then, the signal processing (block 221) and the parameter modifying process (block 571) are sequentially performed.

According to this embodiment, in addition to the advantages achieved in the above-described embodiments, the movement state as well as the deformation state of the test piece at the time of measuring the response state can be approximately matched with the commanded state. Accordingly, it is possible to perform the vibration response evaluation of the entire structure more accurately.

Furthermore, in any one of the above-described embodiments, it is also possible to make a configuration in which an image display apparatus 6 connected to the computer 5 is provided and the computer 2 is provided with an image processing block 59 for integrating the processing result of the numerical simulation block 53 and the measurement result to produce the image data indicating the vibration response of the structure wherein the process result of the image processing block 59 can be displayed on the image display apparatus 6.

According to this embodiment, it is possible to instantly check the state of the vibration test during it, thereby improving the efficiency of the vibration test. Also, the image information processed herein is transferred to the respective actuator systems via the network, thereby enabling to understand the entire condition of the test at each site. Furthermore, as another embodiment, a method of evaluating the vibration response of a structure composed of a main structure and one or more secondary structures connected thereto.

A secondary structure model processing and a numerical simulation processing are repetitively performed and on a parallel with them, a test piece exciting process and a parameter modifying process are performed. In the numerical simulation process, the vibration response of the structure at every predetermined interval is computed based on the numerical model (e.g., part 202 in FIG. 2), a result of a later-described secondary structure model (e.g., part 203 in FIG. 2) processing which is sequentially computed, and a time function given as an external force applied to the structure. In the secondary structure model processing, the characteristics of the secondary structure are modeled by using a finite number of parameters, and then, the response amount in response to the response of the connection with the main structure is computed. In the test piece excitating process, the test piece used to evaluate the characteristics of the secondary structure is excited based on the result of the numerical simulation process, and then measuring the response amount. In the parameter modifying process, the computation result of the secondary structure model processing are compared with the result of the test piece excitation process, and then, the parameters are appropriately modified so that the actual response of the test piece and the response of the secondary structure in the secondary structure model processing are approximately corresponded to each other. More specifically, the process flow of the vibration test shown in FIG. 6 is changed in such a manner as follows. That is, the "model substitute process" is replaced with the "secondary structure model process", and the sequence of processes from the "command producing process" (block 541) to the "signal processing" (block 521) is replaced with the "test piece exciting process". According to this embodiment, it is possible to perform the nonlinear vibration analysis of the structure by using the parameter functioning to approximately match the nonlinear characteristics with the actual state of the structure. Accordingly, it is possible to perform the highly accurate evaluation.

In the foregoing, the present invention has been described based on the preferred embodiments. However, these embodiments are used for only the illustrative purposes, and the present invention is not limited to these embodiments. The scope of the present invention is defined by the accompanying claims and modified examples within the teaching of the claims are all contained in the present invention. Also, the case where the response reaction of the bridge beam to the earthquake is used as an example has been described. However, the application of the present invention is not limited to the bridge beam and the present invention can be applied to various types of structures under various load conditions.

According to the present invention, a vibration test can be implemented with using such a configuration that a computer located at a remote site and one or more actuators are connected via a network. Therefore, it is possible to implement a versatile, highly accurate, and economical test for evaluating the strength and reliability of a large-scale structure to, for example, the earthquake. More specifically, since the test result is not directly influenced by whether or not the vibration test is completed, the reliability of the test can be improved. Furthermore, since it is possible to perform the nonlinear vibration analysis of the structure by using the structural parameters to approximately match the nonlinear characteristics with the actual state of the structure, it is possible to perform the highly accurate evaluation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A vibration testing device comprising one or more actuator systems each including an actuator having a movable part for applying a deformation to a test piece, a control sensor for measuring a drive condition of the actuator, an actuator controlling device for controlling the drive condition of the actuator by using an input instruction signal and an output of the control sensor, and a monitoring sensor for measuring the response condition of the test piece and the drive condition of the actuator; and a computer system for outputting an instruction signal to each actuator system, wherein the computer system has: a measurement processing block for inputting an output of the monitoring sensor and processing the output to be used in a parameter changing block;

a model substituting block for modeling characteristics of the test piece excited in the actuator system by using a finite number of parameters, calculating a response quantity corresponding to the drive condition of the actuator, and inputting the calculation result to a numerical simulation block and the parameter changing block;

the parameter changing block for comparing the calculation result of the model substituting block with the processing result of the measurement processing block, and changing the parameter such that the actual characteristics of the test piece substantially coincides with the characteristics of the test piece in the model substituting block;

the numerical simulation block for calculating a vibration response at each interval of a preset time in accordance with a previously input structure numerical model, the processing result of the model substituting block, and a time function given as an external force applied to the structure; and a waveform generating block for calculating a time function of a deformation to be applied to the test piece in accordance with the result of the numerical simulation block, and outputting it as an instruction value to the actuator controlling device, repeatedly performing a series of processes of the model substitution, the numerical simulation and the waveform generation, and a series of processes of the measurement processing and the parameter change in parallel.

2. The tester according to claim 1, wherein the computer system comprises a main computer having the numerical simulation block, the model substituting block and the parameter changing block, and a sub-computer provided for each actuator system and having the measurement processing block and the waveform generating block for the vibration generator system, and the main computer and the sub-computer are connected with each other through communication means for exchanging data between the blocks.

3. The tester according to claim 1, wherein a signal measured by the control sensor includes information on a displacement applied to the test piece by the actuator, and a signal measured by the monitoring sensor includes information on a reaction force of the test piece against the displacement applied to the vibration generator.

4. The tester according to claim 2, wherein the communication means is the Internet.

5. The tester according to claim 2, wherein the main computer and the sub-computer are provided with timers set at the same time, and in the main computer, the numerical simulation block designates the time when the numerical simulation block starts to operate, as the first designation time to establish the instruction value for the drive condition of the actuator, and in each of the subsequent steps, designates, as the designation time, the time that the preset time for the interval is added to the time designated in the immediately precedent step, and sends, to the waveform generating block, information including the numerical simulation result and the designation time in a set, and in the sub-computer, the waveform generating block generates a waveform so as to establish the numerical simulation result at the designation time, and the measurement processing block acquires a measurement value at the designation time, and the processes in series are performed at the intervals of the preset time.

6. The tester according to claim 1, wherein the tester further comprises an image display device connected with the computer system, and the computer system further has an image processing block of integrating the processing result of the numerical simulation block with measurement information to make image data indicating the vibration response of the structure, and the image display device displays thereon the result of the image processing block.

7. A method for evaluating a vibration response of a structure containing a main structure and one or more secondary structures connected thereto, comprising the steps of:

calculating the vibration response at each interval of a preset time in accordance with a numerical model of the main structure, results of secondary structure model processing subsequently calculated, and a time function given as an external force applied to the structure, by a numerical simulation processing;

modeling characteristics of the secondary structure by using a finite number of parameters and calculating a response quantity corresponding to a response of a portion interconnecting to the main structure, by a secondary structure model processing;

exciting a test piece for evaluating the characteristics of the secondary structure in accordance with the results of the numerical simulation processing to measure its response quantity, by a test piece excitation processing; and comparing the calculation results of the secondary structure model processing with the results of the test piece vibration processing, and successively changing a parameter such that the actual response of the test piece substantially coincides with the response of the secondary structure in the secondary structure model processing, by a parameter change processing, repeatedly performing the secondary structure model processing and the numerical simulation processing, and in parallel with this processing, repeatedly performing the test piece vibration processing and the parameter change processing.

\* \* \* \* \*

UNITED STATES PATENT AND TRADEMARK OFFICE
CERTIFICATE OF CORRECTION

PATENT NO. : 6,718,270 B2
DATED : April 6, 2004
INVENTOR(S) : Horiuchi et al.

It is certified that error appears in the above-identified patent and that said Letters Patent is hereby corrected as shown below:

<u>Title page,</u>
Item [30], insert the following:
-- [30] Foreign Application Priority Data
    Sept. 17, 2001 (JP) ................ 2001-280905 --

Signed and Sealed this

Thirteenth Day of July, 2004

JON W. DUDAS
*Acting Director of the United States Patent and Trademark Office*